United States Patent
Heer

(10) Patent No.: US 10,260,916 B2
(45) Date of Patent: Apr. 16, 2019

(54) DISMOUNTING DEVICE FOR A CABLE

(71) Applicant: KISTLER HOLDING AG, Winterthur (CH)

(72) Inventor: Christian Richard Heer, Winterthur (CH)

(73) Assignee: Kistler Holding AG, Winterthur (CH)

(*) Notice: Subject to any disclaimer, the term of this patent is extended or adjusted under 35 U.S.C. 154(b) by 223 days.

(21) Appl. No.: 15/182,803

(22) Filed: Jun. 15, 2016

(65) Prior Publication Data

US 2016/0370211 A1    Dec. 22, 2016

(30) Foreign Application Priority Data

Jun. 16, 2015 (EP) .................................... 15172424

(51) Int. Cl.
| | | |
|---|---|---|
| *G01D 11/30* | (2006.01) | |
| *H01R 13/58* | (2006.01) | |
| *H01R 13/74* | (2006.01) | |

(52) U.S. Cl.
CPC .......... *G01D 11/30* (2013.01); *H01R 13/746* (2013.01); *H01R 13/5816* (2013.01); *H01R 2201/20* (2013.01)

(58) Field of Classification Search
CPC .... G01D 11/30; G01D 4/002; H01R 13/5816; H01R 13/746; H01R 2201/20; H04B 1/1607
See application file for complete search history.

(56) References Cited

U.S. PATENT DOCUMENTS

| | | | | |
|---|---|---|---|---|
| 2,367,175 A | | 1/1945 | Hahn | |
| 4,846,714 A | * | 7/1989 | Welsby | H01R 13/62 |
| | | | | 285/316 |
| 5,435,745 A | * | 7/1995 | Booth | H01R 9/0521 |
| | | | | 439/583 |
| 6,848,931 B2 | * | 2/2005 | McMullen | H01R 24/40 |
| | | | | 439/350 |
| 7,086,877 B1 | * | 8/2006 | Abbott | H01R 13/447 |
| | | | | 439/133 |
| 9,793,622 B2 | * | 10/2017 | Ehret | H01R 13/622 |
| 2006/0063396 A1 | * | 3/2006 | Bankstahl | B23K 9/32 |
| | | | | 439/11 |

(Continued)

FOREIGN PATENT DOCUMENTS

| | | |
|---|---|---|
| EP | 0338101 | 10/1989 |
| GB | 2505698 A | 3/2014 |
| WO | WO2004/081511 | 9/2004 |

OTHER PUBLICATIONS

European Search Report (16173945.3) dated Nov. 14, 2016.

*Primary Examiner* — Minh N Trinh
(74) *Attorney, Agent, or Firm* — Dority & Manning, P.A.

(57) ABSTRACT

A dismounting device for a cable for dismounting the cable from a wall includes a force receiving member, a sleeve member, an adapter member and a securing element. The sleeve member is mechanically connected to the force receiving member. Each of the adapter member and the securing element is mechanically connected to the sleeve member. The cable is connected to the wall via the adapter member in a mechanically dismountable manner. Furthermore, dismounting of the cable occurs by the flow of force from the adapter member via the securing element onto the sleeve member and from the sleeve member onto the force receiving member.

11 Claims, 4 Drawing Sheets

(56) References Cited

U.S. PATENT DOCUMENTS

2013/0017694 A1* 1/2013 Rodrigues ............... H01R 9/05
    439/133
2016/0370211 A1* 12/2016 Heer ................... H01R 13/746

* cited by examiner

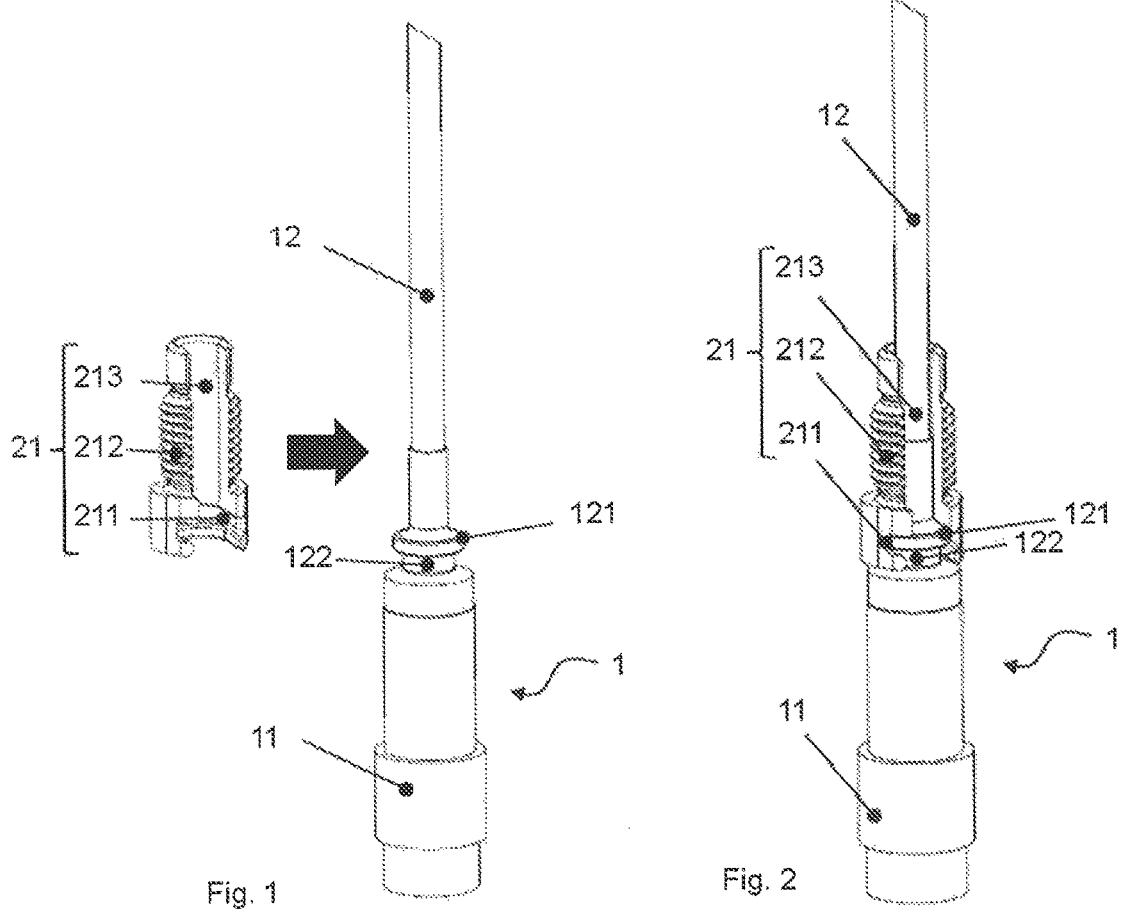

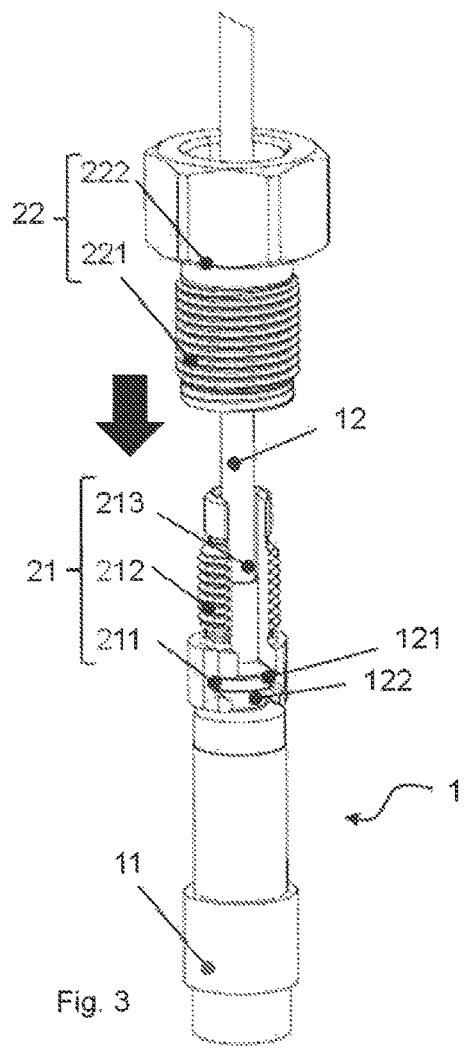
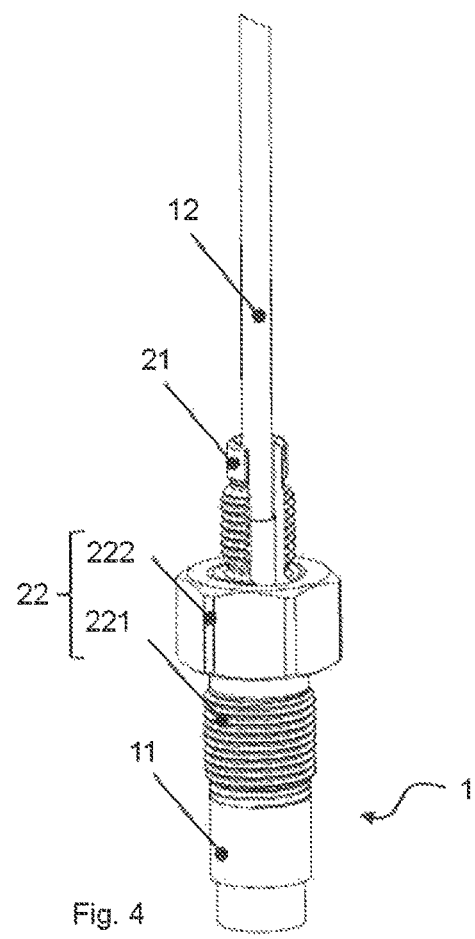
Fig. 3
Fig. 4

DISMOUNTING DEVICE FOR A CABLE

CROSS-REFERENCE TO RELATED APPLICATIONS

This application claims priority to EP Application No. 1517424.2, filed Jun. 16, 2015.

FIELD OF THE INVENTION

The invention relates to a dismounting device for a cable and also relates to a method for dismounting a cable using the dismounting device as well as to a cable for use in said method.

BACKGROUND

Cables are generally known, and they have one or more conductors wherein said conductors may be electrical conductors or light guides that are surrounded by a cable sheath. The conductors serve to conduct energy or signals, respectively.

Document U.S. Pat. No. 2,367,175A demonstrates a cable, which can be mechanically mounted in a wall. The cable is an ignition cable having an electrically shielded high voltage conductor, while the wall is a cylinder wall of an engine. Mounting of the ignition cable into a die cylinder wall is done by means of a spark plug cap. The spark plug cap is screwed into the die cylinder wall. A dismounting device enables dismounting of the ignition cable. The dismounting device consists of an internally threaded union nut of the ignition cable and an externally threaded sleeve of the spark plug cap. Union nut and sleeve form a releasable screw connection. The union nut is clamp connected to the ignition cable via a clamp in a mechanically rigid manner. Union nut and clamp connect the ignition cable to the spark plug cap. For dismounting the ignition cable, first the clamp connection between clamp and ignition cable is released, followed by detaching the screw connection between union nut and sleeve.

A coaxial cable is known from document EP0338101A1 that is screwed onto a fitting of a sensor by means of a union nut. The sensor itself is mounted via a mounting hollow screw into a mounting hole of an injection molding tool. Thus, for dismounting the coaxial cable it is only required to unscrew the union nut from the fitting, Today, cables increasingly form a functional entity with an electrical device or a signaling device. Such a functional entity is also demonstrated in the document WO2004081511A1 where a cable and a sensor cannot be nondestructively separated from each other, and this functional entity is mounted into a wall of an internal combustion engine.

Frequent disassembly of the cables from the wall is necessary for many reasons, for example when the cable is to be replaced or repaired or when the devices or signaling devices forming a functional entity with the cable must be cleaned or repaired. For this purpose, a dismounting force must be applied. This dismounting can be time consuming since the cable and, in case of a functional entity, also the sensor may jam in the wall, for example due to contaminations, thermal expansion, etc., so that the dismounting force will lead to pulling, twisting, jolting and levering at the cable. Thus, the cable may be damaged because of mechanical impact and excessive twisting around its cable axis.

A first object of the present invention is to demonstrate a dismounting device for a cable that is simple and cost-effective. Another object of the invention is to provide a method for dismounting a cable that enables quick and damage-free dismounting of the cable from a wall. Finally, it is an object of the invention to provide a cable for use in said method.

BRIEF SUMMARY OF THE INVENTION

At least one of these objects is achieved by the features generally described below.

The invention relates to a dismounting device for a cable for dismounting the cable from a wall. The cable includes a force receiving member. The dismounting device has a sleeve member that is mechanically connected to the force receiving member; the dismounting device has an adapter member that is mechanically connected to the sleeve member; the dismounting device has a securing element that is mechanically connected to the sleeve member. The cable is connected to the wall via the adapter member in a mechanically dismountable manner. Furthermore, dismounting of the cable is performed by a flow of force from the adapter member via the securing element onto the sleeve member and from the sleeve member onto the force receiving member.

The idea underlying the invention is a dismounting device having a sleeve member, an adapter member and a securing element. Furthermore, the cable includes a force receiving member that is specifically provided for receiving a dismounting force, for example wherein the force receiving member is mechanically reinforced for receiving the dismounting force. The parts of the dismounting device are mounted with respect to each other and on the cable in a way that when a dismounting force is applied at the dismounting device, a flow of force of the dismounting force is directed into the force receiving member of the cable. Furthermore, the parts of the dismounting device are mounted with respect to each other and on the cable in a way that they are freely rotatable together around an axis of the longitudinal direction. In this manner the cable is prevented from twisting when the dismounting force is applied.

The invention also relates to a method for dismounting a cable using the dismounting device as well as to a cable for use in said method.

BRIEF DESCRIPTION OF THE DRAWINGS

In the following, the invention will be illustrated with respect to the Figures which show FIG. 1 is an elevated perspective view of a portion of a preferred embodiment of a cable in the course of sliding on a sleeve member of a dismounting device;

FIG. 2 is a view of the cable according to FIG. 1 with the sleeve member placed thereon;

FIG. 3 is a view of the cable according to FIG. 2 in the course of sliding on an adapter member of a dismounting device;

FIG. 4 is a view of the cable according to FIG. 3 with the adapter member placed thereon;

DESCRIPTION OF EXEMPLARY EMBODIMENTS OF THE INVENTION

Figure 5:
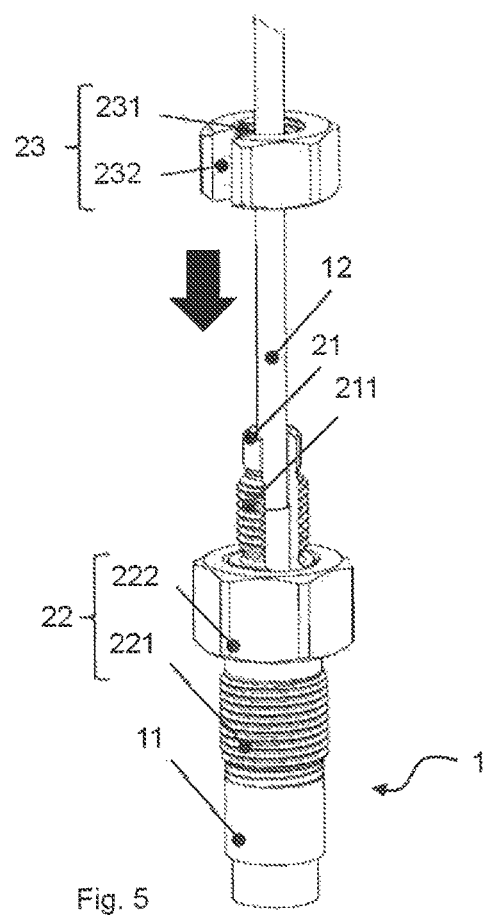
FIG. 5 is a view of the cable according to FIG. 4 during screwing on a securing element of a dismounting device.
Figure 6:
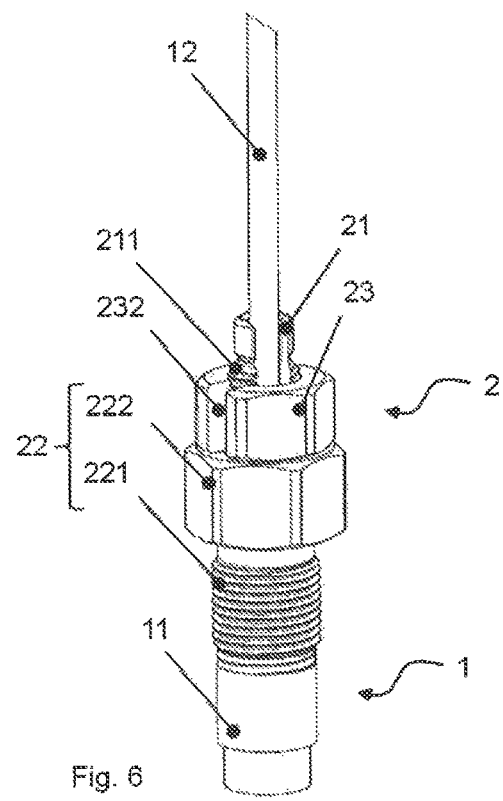
FIG. 6 is a view of the cable according to FIG. 5 with the securing element screwed thereto.
Figure 7:
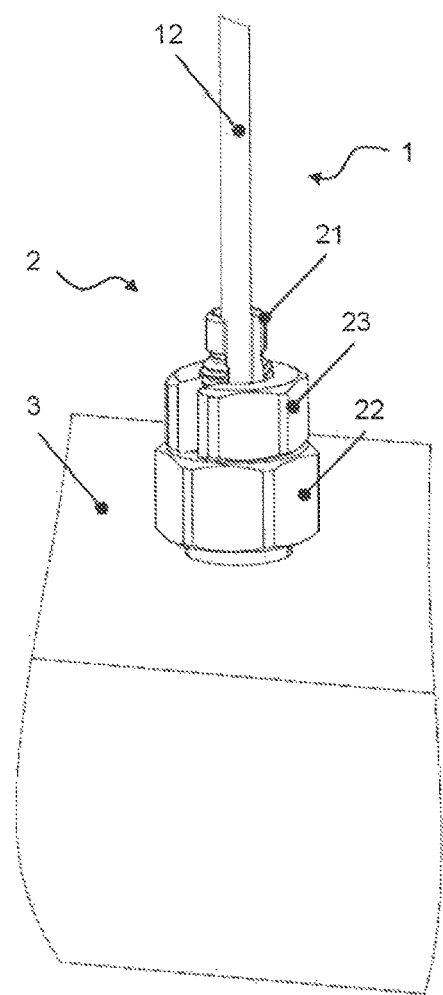
FIG. 7 is a view of the cable according to FIG. 6 after mounting in a wall.
Figure 8:
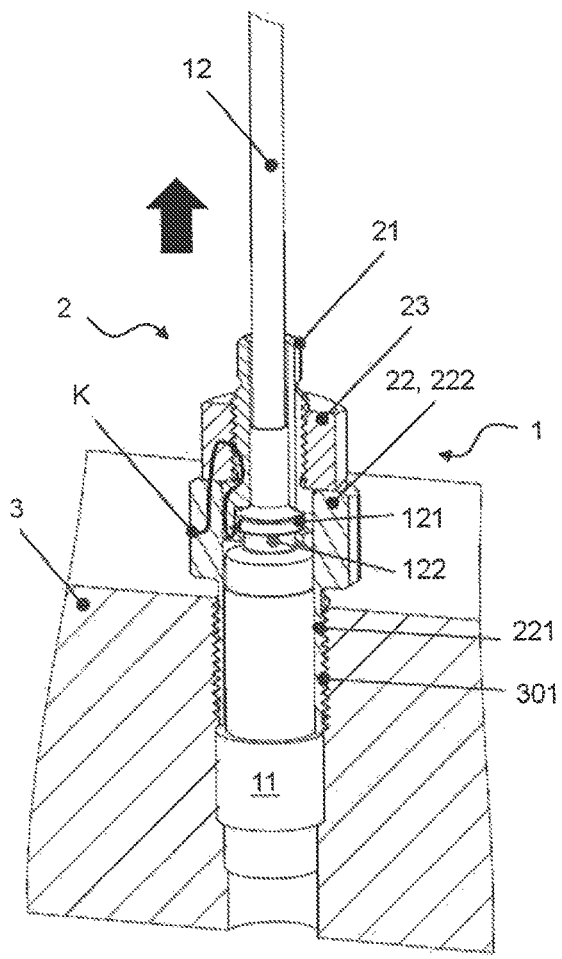
FIG. 8 a cross section of the cable according to FIG. 7 with the flow of force during dismounting of the cable from the wall.

FIGS. 1 to 6 show a cable 12 while a dismounting device 2 (FIG. 6) is assembled on the cable 12. FIG. 7 shows the cable 12 with the dismounting device 2 assembled thereon after it has been mounted in a wall. FIG. 8 shows the dismounting of the cable 12 from der wall 3 by means of the dismounting device 2.

In a presently preferred embodiment, the cable 12 is part of a sensor arrangement 1 including a sensor 11. The cable 12 and the sensor 11 form a functional entity wherein the cable 12 and the sensor 11 cannot be separated in a nondestructive manner. The cable 12 includes one or more conductors (not shown) that are surrounded by a cable sheath. The conductors serve to conduct energy or signals, respectively. In the sense of the invention, the adverb "respectively" is used with the meaning of "and/or". The conductors may be electrical conductors made of metal such as copper, copper alloys, etc., but they may also be light guides made of synthetic fibers, quartz glass fibers, etc. The cable sheath protects the conductors from external influences. The sensor 11 can be a sensor of a physical property such as force, pressure, acceleration, temperature, etc. The connection of the conductors to the sensor is not shown. The sensor 11 includes a sensor sheath. The sensor sheath protects the sensor from external influences. Cable sheath and sensor sheath may be made of electrically insulating synthetic material such as polyethylene, polyurethane, etc. Cable sheath and sensor sheath may include an electromagnetic shielding made of metal such as steel alloys, aluminum alloys, etc. Cable sheath and sensor sheath may be tubular or braided forming a mechanical protection. Cable sheath and sensor sheath may be water-tight or gas-tight. The parts of the sensor arrangement 1 are radially symmetrical with respect to their longitudinal extension. The longitudinal extension of the cable 12 and the sensor 11 are referred to as the longitudinal direction. The radial extension of cable 12 and sensor 11 is called the radial direction.

In a presently preferred embodiment, the sensor is a piezoelectric pressure sensor by the applicant, model numbers 6021, 6023 and 6025. Cable sheath and sensor sheath are made of stainless steel, nickel-based steel alloys, etc. As shown in FIG. 8 for example, a sensor arrangement 1 of this type is mounted in a wall 3 of a machine such as an internal combustion engine, a turbine, a press, etc.

As shown in FIGS. 5-8 for example, an exemplary dismounting device 2 includes a sleeve member 21, an adapter member 22 and a securing element 23. Sleeve member 21 adapter member 22 and securing element 23 are preferably made of metal such as steel alloys, aluminum alloys, etc. Knowing the present invention, the skilled artisan may also use synthetic materials such as polyethylene, polyurethane, etc. as the material for the dismounting device 2. The parts of the dismounting device 2 are generally radially symmetrical with respect to their longitudinal extension. In the sense of the invention, the adjective "generally" is used with the meaning of "more than/equal to 90%".

For dismounting the cable 12 by means of the dismounting device 2, the dismounting device 2 is assembled on the cable 12 beforehand and the cable 12 with the dismounting device 2 mounted thereon is mounted in the wall 3.

In a first step of the assembly, the sleeve member 21 is mechanically connected to the cable 12. According to FIGS. 1 and 2, the sleeve member 21 is slid over a force receiving member 121 of the cable 12. This mechanical connection is a first form closure. The force receiving member 121 is a mechanical reinforcement of the cable 12 designed for receiving the dismounting force. The force receiving member 121 is formed as a rib. The force receiving member 121 preferably extends as a rib completely around the outer perimeter of the cable sheath at an angle to the longitudinal direction. The force receiving member 121 desirably projects several millimeters from the surface of the cable sheath in a radial direction and desirably extends several millimeters in the longitudinal direction, Adjacent to the force receiving member 121 a sleeve guide element 122 is arranged in the outer perimeter of the cable sheath. The sleeve guide element 122 is formed as a groove. The sleeve guide element 122 preferably extends as a groove completely around the outer perimeter of the cable sheath at an angle to the longitudinal direction. The force receiving member 121 and the sleeve guide element 122 are integral with the cable sheath.

As shown in FIG. 1 for example, the sleeve member 21 desirably is a hollow cylinder being several centimeters in length in the longitudinal direction and having a central bore, an inner sheath surface and an outer sheath surface. The inner sheath surface of the sleeve member 21 has an outer shape that essentially corresponds to a respective outer sheath surface of the cable sheath, In a region of the outer shape that corresponds to a region of the cable sheath bearing the force receiving member 121, the sleeve member 21 includes a sleeve member groove 211. The sleeve member groove 211 runs at an angle to the longitudinal direction as a groove in the inner sheath surface of the sleeve member 21. The sleeve member 21, on its outer sheath surface, has a sleeve member external thread 212. The sleeve member 21 is slit in the longitudinal direction by a sleeve member slit 213. The length of the sleeve member slit 213 extends over the entire length of the sleeve member 21 while its width corresponds to the diameter of the cable 12. As shown by an arrow in FIG. 1, the sleeve member 21 can be slid from the outside in a radial direction onto the cable 12 by means of the sleeve member slit 213 whereby the first form closure is achieved. The sleeve member 21 that has been slid onto the cable 12 is shown in FIG. 2. The force receiving member 121 extends radially into the sleeve member groove 211. A sleeve member end of the sleeve member 21 that is oriented towards the sensor 11 sits in the sleeve guide element 122. When the first form closure is achieved, the sleeve member 21 can be rotated freely around the axis of the longitudinal direction. The sleeve guide element 122 guides the sleeve member 21 during this free rotation.

In a further step of the assembly, the adapter member 22 is mechanically connected to the sleeve member 21. According to FIGS. 3 and 4, the adapter member 22 is slid onto the sleeve member 21. This mechanical connection is a second form closure. The adapter member 22 desirably is a hollow cylinder several centimeters in length in the longitudinal direction and having a central bore, an inner sheath surface and an outer sheath surface. The outer sheath surface of the adapter member 22 carries an adapter member external thread 221 and an adapter member head 222. A diameter of the inner sheath surface of the adapter member 22 essentially matches a diameter of the outer sheath surface of the sleeve member 21. As shown by an arrow in FIG. 3, the adapter member 22 can be slid via the central bore onto the sleeve member 21 in a longitudinal direction whereby the second form closure is achieved. The adapter member 22 that has been slid onto the sleeve member 21 is shown in FIG. 4. The second form closure is such, that the adapter member 22 and the sleeve member are freely rotatable together around the axis of the longitudinal direction. The second form closure is achieved due to the shapes of the outer sheath surface of the sleeve member 21 and the inner sheath surface of the adapter member 22. Thus, one of these sheath surfaces may be polygonal in shape in the diameter or a pin may be arranged on one of these sheath surfaces that can engage a corresponding recess on the other sheath surface. An adapter member end of the adapter member 22 that is oriented towards the sensor 11 abuts on a stop of the sensor 11 so that the adapter member 22 is prevented from sliding over the sensor 11 in a longitudinal direction. Sleeve member 21 and adapter member 22 are positioned with respect to each other in a way that the sleeve member external thread 212 and the adapter member external thread 221 are easily accessible from the outside.

In a further step of the assembly, the securing element 23 is mechanically connected to the sleeve member 21. According to FIGS. 5 and 6, the securing element 23 is screwed onto the sleeve member 22. This mechanical connection is a force-fit connection. The securing element 23 is a hollow cylinder several centimeters in length in the longitudinal direction and having a central bore, an inner sheath surface and an outer sheath surface. The securing element 23 is slit in the longitudinal direction by a securing element slit 232. The securing element slit 232 extends along the entire length of the securing element 23 while its width corresponds to a diameter of the cable 12. The securing element 23 can be slid from the outside in a radial direction onto the cable 12 by means of the securing element slit 232. The inner sheath surface of the securing element 23 bears a securing element internal thread 231. A diameter of the inner sheath surface of the securing element 23 essentially matches the diameter of the outer sheath surface in the region of the sleeve member external thread 212. As demonstrated by an arrow in FIG. 5, the securing element 23 can be screwed by means of the securing element internal thread 231 onto the sleeve member external thread 212 in the longitudinal direction to achieve the force-fit connection. The securing element 23 that has been screwed onto the sleeve member 21 is shown in FIG. 6. The force-fit connection between the securing element 23 and the sleeve member 21 is such that the securing element 23 and the sleeve member 21 can be freely rotated together around the axis of the longitudinal direction.

FIG. 7 shows the cable 12 mounted in a wall 3 by means of the dismounting device 2. For this purpose, the cable 12 is screwed into a mounting hole internal thread 301 (FIG. 8) of the wall 3 by means of the adapter member external thread 221. This mechanical connection is a force-fit connection.

FIG. 8 schematically shows the flow of force by the thin and winding arrow shaft designated K while the cable 12 is dismounted from the wall 3 by means of the dismounting device 2. For this purpose, a dismounting force is applied to the adapter member head 222, for example using a tool such as a wrench, etc. (not shown). The flow of force is indicated as a winding arrow. The flow of force K progresses from the adapter member head 222 via the securing element 23 onto the sleeve member 21 and from the sleeve member 21 onto the force receiving member 121. The dismounting force, via the adapter member external thread 221, screws the cable 12 out of the mounting hole internal thread 301 of the wall 3. If now additional pulling, twisting, jolting or levering is applied at the dismounting device 2 in order to remove the cable 12 from the wall 3, this dismounting force cannot lead to twisting of the cable since the parts of the dismounting device 2 are freely rotatable together around the axis of the longitudinal direction.

A person skilled in the art and knowing the present invention is able mount the dismounting device 2 onto the sensor 11 instead of the cable 12 and is able to mount the dismounting device 2 onto the cable 12 as well as onto the sensor 11.

LIST OF REFERENCE NUMERALS 1 sensor arrangement
2 dismounting device
3 wall
11 sensor
12 cable
121 force receiving member
122 sleeve guide element
21 sleeve member
22 adapter member
23 securing element
211 sleeve member groove
212 sleeve member external thread
213 sleeve member slit
221 adapter member external thread
222 adapter member head
231 securing element internal thread
232 securing element slit
301 mounting hole internal thread
K flow of force

The invention claimed is:

1. A dismounting device for dismounting a cable from a wall wherein the cable having a force receiving member, the dismounting device comprising:
   a sleeve member that defines an interior surface that defines a groove configured to connect mechanically to the force receiving member of the cable;
   an adapter member in form of a hollow cylindrical member with an inner sheath surface having a central bore about a longitudinal axis, the hollow cylindrical member including an outer sheath surface, which includes an external thread at a first end of the hollow cylindrical member, the adapter member further comprises an adapter member head at a second end of the hollow cylindrical member, wherein the adapter member is mechanically connected to the sleeve member and wherein the external thread is configured to be connected to the wall in a mechanically dismountable manner;
   a securing element mechanically connected to the sleeve member; and
   wherein the securing element, the sleeve member and the adapter member are mechanically connected to ensure the dismounting of the cable occurs by a flow of force from the adapter member by the securing element onto the sleeve member and from the sleeve member onto the force receiving member.

2. The dismounting device according to claim 1, wherein the sleeve member is freely rotatable around the longitudinal axis via the groove defined in the interior surface of the sleeve member when the sleeve member is mechanically connected to the force receiving member.

3. The dismounting device according to claim 2, wherein the sleeve member includes a sleeve member slit that is configured and disposed so that the sleeve member can be slid onto the force receiving member via the sleeve member slit by moving the sleeve member in a radial direction relative to the longitudinal axis so as to mechanically connect the sleeve member to the force receiving member.

4. The dismounting device according to claim 3, wherein the groove defined in the sleeve member extends at an angle to the longitudinal axis such that when the sleeve member has been slid onto the force receiving member then the force receiving member projects into the groove defined in the sleeve member.

5. The dismounting device according to claim 2, wherein the groove defined in the sleeve member restrains longitudinal movement of the sleeve member during free rotation of the sleeve member about the longitudinal axis.

6. The dismounting device according to claim 2, wherein the adapter member is mechanically connected to the sleeve member; and wherein the adapter member and the sleeve member are freely rotatable together around the longitudinal axis after the adapter member is mechanically connected to the sleeve member.

7. The dismounting device according to claim 6, wherein the adapter member can be slid onto the sleeve member in the longitudinal direction via the central bore before the adapter member is mechanically connected, to the sleeve member.

8. The dismounting device according to claim 6, wherein the sleeve member defines an outer sheath surface, and wherein the inner sheath surface of the adapter member defines a shape configured to connect to the outer sheath surface of the sleeve member.

9. The dismounting device according to claim 6, wherein the sleeve member defines a sleeve member external thread, and the sleeve member and the adapter member are positioned with respect to each other in a way that the sleeve member external thread and the adapter member external thread are easily accessible from the outside.

10. The dismounting device according to claim 6, wherein the securing element is mechanically connected to the sleeve member via a force-fit connection; and wherein the securing element and the sleeve member are freely rotatable together around the longitudinal axis after the force-fit connection is achieved.

11. The dismounting device according to claim 10, wherein the securing element includes a securing element internal thread; wherein the sleeve member includes a sleeve member external thread; and wherein the securing element can be screwed in the longitudinal direction via the securing element internal thread onto the sleeve member external thread to achieve the force-fit connection.

* * * * *